United States Patent
Kanstad

(10) Patent No.: US 6,652,468 B2
(45) Date of Patent: Nov. 25, 2003

(54) INFRARED RADIATION SOURCE AND ITS APPLICATION FOR GAS MEASUREMENT

(76) Inventor: Svein Otto Kanstad, Skogane 10, P.O.B. 183, N-6101 Volda (NO)

( * ) Notice: Subject to any disclaimer, the term of this patent is extended or adjusted under 35 U.S.C. 154(b) by 0 days.

(21) Appl. No.: 10/355,008

(22) Filed: Jan. 31, 2003

(65) Prior Publication Data

US 2003/0139682 A1 Jul. 24, 2003

Related U.S. Application Data

(62) Division of application No. 09/743,866, filed as application No. PCT/NO99/00240 on Jul. 19, 1999, now Pat. No. 6,540,690.

(30) Foreign Application Priority Data

Jul. 17, 1998 (NO) ............................................. 19983334
Jul. 17, 1998 (NO) ............................................. 19983335

(51) Int. Cl.$^7$ ................................................. A61B 5/08
(52) U.S. Cl. ....................................................... 600/532
(58) Field of Search ................................. 600/537, 532, 600/310, 360, 529, 493.1, 495.1; 250/504 R

(56) References Cited

U.S. PATENT DOCUMENTS

| | | | |
|---|---|---|---|
| 4,620,104 A | 10/1986 | Nordal et al. | |
| 4,644,141 A | 2/1987 | Hagen et al. | |
| 4,859,859 A | 8/1989 | Knodle et al. | |
| 5,092,342 A | 3/1992 | Hattendorff et al. | |
| 5,220,173 A | 6/1993 | Kanstad | |
| 5,261,415 A | 11/1993 | Dussault | |
| 5,324,951 A | 6/1994 | Kocache et al. | |
| 5,369,277 A | 11/1994 | Knodle et al. | |
| 5,445,160 A | 8/1995 | Culver et al. | |
| 5,567,951 A | 10/1996 | Baschant et al. | |
| 5,838,016 A | 11/1998 | Johnson | |
| 5,864,144 A | 1/1999 | Laine | |
| 6,325,978 B1 | 12/2001 | Labuda et al. | |

FOREIGN PATENT DOCUMENTS

| | | |
|---|---|---|
| EP | 0 720 730 | 6/1996 |
| EP | 0 859 536 | 8/1998 |
| WO | WO 95 08755 | 3/1995 |
| WO | WO 96 12165 | 4/1996 |
| WO | WO 97 04623 | 2/1997 |
| WO | WO 97 09593 | 3/1997 |

OTHER PUBLICATIONS

D.C. Laine et al., "Pulsed wideband IR thermal source", *IEE Proc.–Optpelectron*, (1997), vol. 144, No. 5, pp. 315–322.

*Primary Examiner*—Daniel Robinson
(74) *Attorney, Agent, or Firm*—Browdy and Neimark, P.L.L.C.

(57) ABSTRACT

A method for identification, measurement and/or warning of a gas with a sensor composed of: a pulsed, radiation-cooled infrared radiation source heated by single pulses of electric current, an infrared detector which is adapted to the detection of pulsed infrared radiation from the radiation source, at least one infrared spectrally selective element arranged between the radiation source and the detector for spectral selection of the infrared radiation corresponding to specific spectral characteristics of the gas, a volume of gas that is arranged between the radiation source and the detector, optics arranged to guide infrared radiation from the radiation source via the spectrally selective element onto the detector through the volume of gas, and an electronics unit for registration, amplification, treatment and/or presentation of such electrical signals as result when the infrared radiation illuminates the detector through the gas via the spectrally selective element.

12 Claims, 2 Drawing Sheets

INFRARED RADIATION SOURCE AND ITS APPLICATION FOR GAS MEASUREMENT

Figure 1:
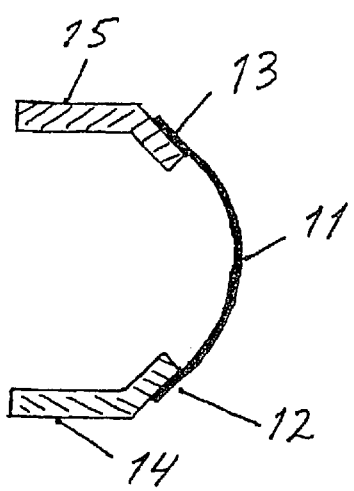

This is a division of U.S. application Ser. No. 09/743,866, filed on Jan. 17, 2001 now U.S. Pat. No. 6,540,690, which is a 371 of PCT/NO 99/00240 filed Jul. 19, 1999. The entirety of that application is incorporated herein by reference.

This invention concerns electrically pulsed infrared radiation sources, and discloses how, with simple means, one may specify and improve their performance far beyond what is possible in the prior art. This shall offer considerable advantages when utilizing such radiation sources in connection with gas sensors in particular, which by using infrared radiation sources according to the invention may be made better, simpler and less expensive compared to what has been possible earlier.

Infrared (IR) sensors for gas comprise both IR sources and IR detectors. IR detectors normally react only on changes in IR radiation. In connection with technical measurements this is traditionally established by pulsing the radiation by means of a so-called "chopper", a rotating wheel with holes that chop the radiation from a constant (CW) source. This generates large temperature amplitudes between the hot source and the cold chopper blade, as seen from the IR detector. The radiation pulses may then be exactly calculated, because the temperatures will be known both for the IR source and the chopper blade. However, the pulses are locked onto one given frequency only, and the technique depends on expensive, inflexible and often delicate equipment with moving parts that are not adapted to modern electronic technology.

During the 80's such chopped sources were to a large extent replaced by sources that could be electrically modulated, in which cases the source becomes heated by means of electrical pulses and is cooled by heat conduction into the immediate surroundings of the source. Only weak modulations of the source's temperature may hereby be achieved, however, with amplitudes of the order of 1–10 K. As seen from the detector, the IR signals then become considerably weaker, with corresponding loss of sensitivity and resolution in technical measurements. Moreover, because the physical conditions concerning the heating and cooling of the source are in such cases not well defined, it also becomes difficult in advance to calculate—and to design the source for—the strength of the resulting IR signals.

IR detectors convert the IR signal into electrical signals with detector-specific responsivities R [V/W]. Next the electrical signals are subject to standard electronic amplification and signal treatment. The IR signal increases with the strength of the IR pulses. Therefore, large temperature amplitudes $\Delta T$ for the source are essential. The measurements, however, are limited by noise, too, which is chiefly caused by the detector. In this respect, IR detectors are defined by their "Noise-Equivalent-Power", NEP, which increases with the square root of the electrical bandwidth $\Delta f$ of the signal electronics; NEP$\sim(\Delta f)^{1/2}$. In the most commonly used IR detectors, it is also the case that the noise increases in inverse proportion with the frequency at low frequencies, so-called 1/f noise, and only reaches a constant, low level at frequencies typically exceeding 500–1,000 Hz. When using chopped IR sources, this is solved by chopping at sufficiently high pulse rates, often of the order of 1,000 Hz or more.

With electrically modulated IR sources, however, that is not possible, because the modulation frequencies will be limited to ca 100 Hz, and even then with temperature amplitudes of the order of 1 K only. This results in small IR signals and large 1/f noise in existing, electrically modulated IR sensors.

The quality of an IR measurement is given by the signal-to-noise ratio S/N, which to good measure will be proportional to $\Delta T$ and inversely proportional to $(\Delta f)^{1/2}$; i.e., S/N$\sim\Delta T/(\Delta f)^{1/2}$. Given $\Delta T$ and $\Delta f$, the properties of the sensor thus may be calculated rather exactly as a basis for its constructional making, design and manufacture. Within existing techniques one attempts to increase S/N by employing a small electric bandwidth in the measurement. This is made by including a narrow-band electronic filter into the detector electronics, that will pass electrical signals inside a very limited frequency band $\Delta f$ only near the chosen pulse frequency f. For sensors with chopped IR sources—and for modulated IR sources in particular where the frequency is lower and the 1/f noise from the detector is higher and the bandwidth therefore has to be further narrowed—this in both cases implies that every single measurement shall take a long time, from seconds up to several minutes. Temporal resolution for time varying signals thus becomes inferior. Moreover, the measurements are carried out in continuous sequence, the sources are on all the time and draw a lot of current.

Added to the long time constants these are further deficiencies suffered by existing IR gas sensors. U.S. Pat. No. 5,220,173 opens for a possible solution to those problems, through its disclosure of an electrically pulsed thermal IR source which is cooled by thermal radiation between the pulses. Radiation-cooled IR sources may achieve temperature variations of the order of 100 K or more, with correspondingly strong IR pulses. The possibility then also exists to perform measurements by means of single pulses at chosen times, with the source turned off in between pulses. This may afford good temporal resolution and low current loads, with IR signals that approach those obtained with choppers. Said U.S. Patent, however, only provides the necessary conditions for the manufacture of a pulsed, radiation-cooled thermal IR source. The patent gives no answer as to how one may achieve temperature amplitudes of prescribed, preferred magnitudes, nor does it give any advice on which pulse lengths may be used. Such information is vital in order to produce IR sources whose performance and yield are determined from the requirements set by concrete applications, for example, when making real IR sensors which are optimized in relation to signal strength, temporal resolution, S/N ratio etc for a given technical measurement task.

The present invention takes as its starting point the said U.S. Pat. No. 5,220,173, and teaches how one may produce IR sources with powerful and entirely specified single IR pulses.

Suppose that the IR source is made from an electrically conductive foil shaped material, and that it radiates from a higher temperature $T_m$ which is maintained for a certain element of time, subject to excitation by a pulse of electric current from a suitable electric drive circuit.

Normally the temperature is set depending on the spectral region which the source is to cover, often $T_m$ may be found in the region 800–1,000 K. According to Planck's law, the source then radiates with a power $P=\epsilon\sigma T_m^4$ per unit square, where $\epsilon<1$ is the emissivity of the source surface and a $\sigma=5.67\cdot10^{-12}$ W cm$^{-2}$ K$^{-4}$ is the Stefan-Boltzmann constant. Compared with the radiation given off, the source receives little radiation in return from its surroundings, which are closer to room temperature. Likewise, suppose that the measurement task requires IR pulses of duration θ. With surface area A, and assuming that the source radiates equally to both sides, the IR source shall give off a net amount of radiative energy during the pulse that is, to good approximation, given by $$E_r = 2A\epsilon\sigma\theta T_m^4 \tag{1}$$

When the current pulse is switched off, the source supposedly becomes rapidly cooled by a large, predetermined temperature amplitude ΔT to a lower temperature $T_0$, to produce a preferred magnitude of the IR signals. For the present IR sources according to the invention, such cooling occurs by means of thermal radiation, according to the said U.S. Pat. No. 5,220,173. The foil shaped material is assumed to have thickness d. Cooling the source across a temperature interval ΔT from $T_m$ to $T_0$ then requires that an amount of thermal energy $E_s$ be removed from the source, where $$E_s = CAd\rho\Delta T, \tag{2}$$

in which ρ is the density and C is the specific thermal capacity of the source material.

A corresponding amount of energy must be supplied by the following current pulse in the form of electrical energy, in order to raise the source temperature from To back to $T_m$. For the IR source to satisfy the requirements of radiation cooling, according to the said U.S. Patent, the source must be made so as to make $E_r > E_s$. From this follows by simple calculation starting with (1) and (2), that the IR source must be made from a material with thickness d that obeys the relation $$d < 2\epsilon\sigma\theta T_m^4 / C\rho\Delta T \tag{3}$$

Relation (3) discloses how pulsed, radiation-cooled IR sources must be made in order to make temperature amplitudes of ΔT dimension feasible at pulse lengths θ. The necessary and sufficient physical requirements and conditions for producing radiation-cooled, pulsed IR sources thus are determined by those combinations of temperature amplitudes and pulse lengths which the sources are to produce. Relation (3) is new and entirely general, and is valid for any areal shape and size of the source, because all parts of the source surface are locally cooled by thermal radiation transversely to the surface and independently of heat conduction along the surface. When made according to relation (3), therefore, IR sources with large emitting surfaces may be pulsed as rapidly and as often as small sources; with previous, conduction-cooled sources this could not be done. Relation (3) is a characterizing feature of the present invention. According to the invention, the source may also be formed in such a way that the foil shaped material is either heated in its entirety, or that only certain parts of the source become heated to the actual temperatures; in any case it is the thickness of those parts of the source which are to be heated to the temperature $T_m$ that occurs in relation (3).

The invention opens up for the manufacture of electrically pulsed IR sources which satisfy stated, preferred technical data and specifications, in a manner similar to IR detectors and other modern optical and electronic components and products. Next, this makes it possible to develop simple and inexpensive pulsed IR sensors that are adapted to particular applications, and whose performance may be calculated and specified even in the design phase. Such sensors by themselves represent a considerable novelty as compared with the prior art. The challenge will be to manufacture, to an industrial scale, such IR sources that can withstand those large thermal and mechanical strains which may arise, when they become subjected to frequent, repeated temperature excursions of 100 K or more. For most materials, this may bring about fracture due to buckling.

As another problem, the source may twist and bend as a result of heating, which produces an unstable source with shifting IR illumination of the IR detector. The invention has as its aim to provide solutions for all such tasks and problems, by creating a technological platform for industrial manufacture of improved IR sources, both as special, self-contained products and as essential, specified components in equipment that employs the source and its qualities in new and advanced methods and sensors for IR measurements of gas.

Figure 2:
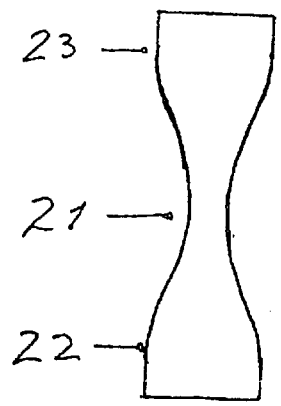
Figure 3:
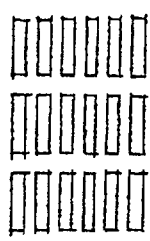
Figure 4:
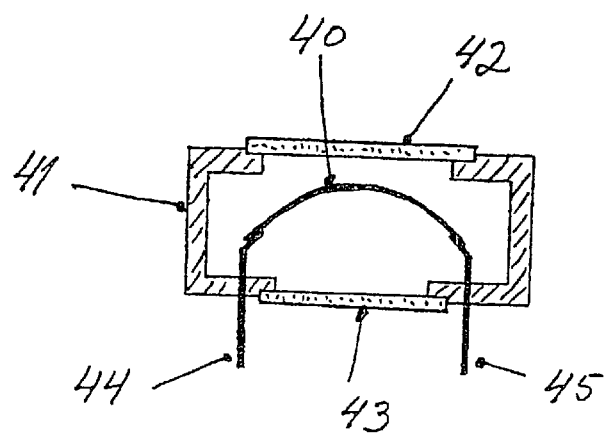
Figure 5:
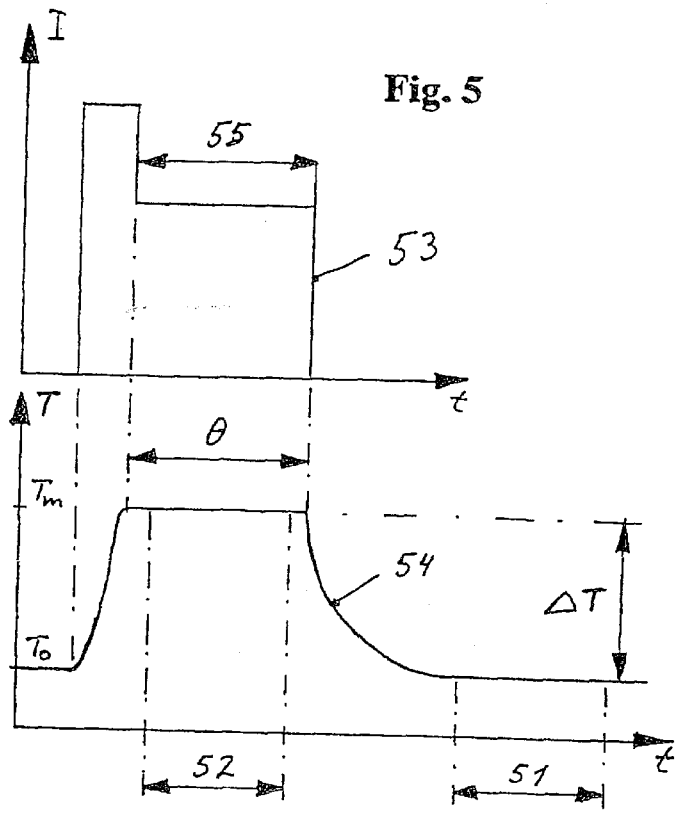
Figure 7:
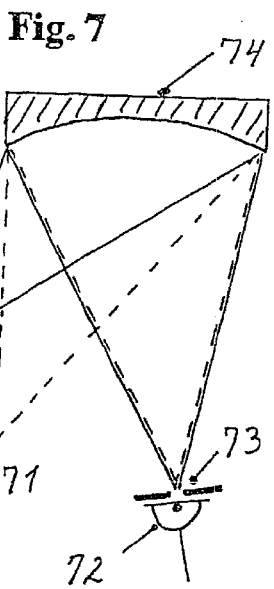
Figure 6:
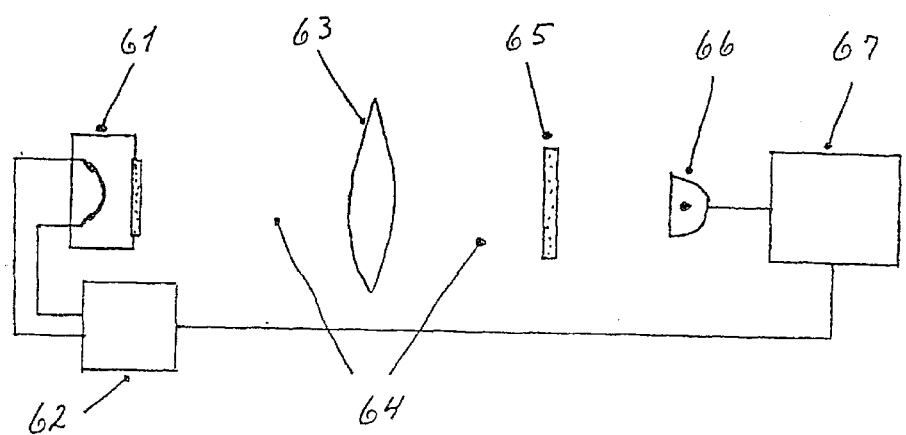

Below, the invention is to be more closely presented and described, by means of references to and comments on the patent claims and by referring, in particular, to the figures, in which all shapes and dimensions may be distorted in the interest of illustrating a point, and where FIG. 1 shows a preferred mounting of the IR source FIG. 2 shows a preferred shape of the IR source FIG. 3 shows a joint mounting of several IR sources FIG. 4 shows an example of an encapsulated IR source FIG. 5 shows a preferred pulse of current with the resulting IR pulse FIG. 6 shows in principle the design of an IR gas sensor FIG. 7 shows the use of two or more IR sources with a spectrally dispersive element.

A deeper insight into the invention may be reached by examining the invention in more detail.

The crucial feature is the relation—identical with (3) which imposes an upper limit on the thickness of the foil shaped material of the source element, in order for the IR source to be produced in accordance with the specifications that are required in regard to technical performance. The said relation includes the material parameters ε, C and ρ, which most often allow only limited latitude; ε is chosen to be as high as practically possible in each case, normally a value between 0.5 and 1, and the product Cρ for most regular materials has a value in the range 2–4 $JK^{-1}cm^{-3}$. For IR gas measurements, the emission temperature may be around 1,000 K, which produces a broad thermal spectrum from the source with a maximum near 3 μm wavelength and well suited for the spectra of most relevant gases. With $T_m$=1,000 K, Cρ=3 $JK^{-1}cm^{-3}$ and ε=0.8 as typical values, the requirement on the IR source thickness thus may be expressed as $$d < 3\theta/\Delta T [cm]. \tag{4}$$

In many practical situations this relation will be valid within a factor of 2. It provides a starting point to set the specifications for a desired source. For instance, if temperature amplitudes of 100 K and pulse lengths of 10 ms are desired, the source must be made, according to relation (4), from a material thinner than about 3 μm. This hints at the dimensions in question. For many materials, such thicknesses approach the limit of what may be technically feasible, because substantially thinner foils may have difficulties in supporting themselves.

Likewise, if the actual applications of the IR source might require temperature amplitudes of 500 K magnitude, the pulse length, too, will have to be increased, to 50 ms or more. Thus, high temporal resolution and large IR signals cannot be combined without further measure.

However, limits on the pulse length are set not only by the requirements of time resolution.

In order to describe a pulse of duration θ, a frequency spectrum is required whose width Δf is, to good approximation, given by $\Delta f = 2\Pi/\theta$. Therefore, the detector electronics must have at least this electrical bandwidth. The frequency spectrum $\Delta f$ determines the width of the noise spectrum in the measurements. In other words, the noise shall increase inversely with the square root of the pulse length, NEP~$(\Delta f)^{1/2}$~$(\theta)^{-1/2}$, to make the S/N-relation vary as S/N~$\Delta T \cdot (\theta)^{1/2}$. Thus, as far as noise is concerned long pulses as well as large IR signals are advantageous, because both factors contribute to increasing the S/N ratio. For exact measurements of low gas densities, therefore, one must emphasize the use of long pulses, at the expense of high time resolution. This implies that, in practical circumstances, the particular applications which the IR source is to serve need to be taken into account when, according to the invention, one sets the requirements and specifications for its design and manufacture.

As was shown, quite often one may have to make a compromise between diverging factors.

FIG. 1 depicts an IR source as mounted with its ends onto two fastening arrangements 14 and 15,—which may also serve as electrical contacts—, in such a way that the end surfaces of the source make an angle with each other as seen from the side. The source then shall be standing as a curve-shaped bridge between the fixtures. Such a mounting solves the problem of breakage due to buckling when the source becomes repetitively heated and cooled with large temperature amplitudes. Advantageously, the source may be mounted so as to make the freely suspended part of the curve lie wholly inside the corresponding circular sector whose tangents coincide with those of the source at the fixture contacts, however, without making any abrupt changes in curvature. The fastening arrangements ought to be fixed in space, and the source should be permanently and solidly attached to those, e.g., by the use of screws, squeezing, welding or similar means. This also avoids that the source may bend and twist during a pulse of current. The source's reaction upon the heating will then be limited to microscopic movements of its middle parts, back and forth in axial direction facing the detector. This takes place without any mechanical stress being induced in the material. As seen from the detector, the source constitutes a geometrically and postionally stable shape, with a radiation lobe that does not change during the pulse. This solution can employ a favourable angle between the fixture surfaces in the range 60°–120°.

In order to locate the heating to a preferred part of the source, most often near the middle of its length extension, the source may be given a weakly tapering shape towards the center of the hot region. Thereby the thermal emission shall be permanently concentrated to a predetermined part of the source, shown as item 21 in FIG. 2. Outside of this region, the width may be constant, or it may widen into two broader ends 22 and 23 as is also shown in FIG. 2. Since the local electrical heating decreases with the square of the width, a solution as illustrated in the said figure also serves to reduce heat losses caused by thermal conduction into the fixtures. Moreover, the mechanical position of the source becomes further stabilized. Similar localization of the heating, with possible reduction of conductive heat losses, too, may be obtained by making the source's thickness vary in a corresponding manner towards that region where the heat is chiefly to be deposited. The designs may also be combined into one and the same source element. In an industrial context, the shaping of the source may preferably be made through die cutting, etching or other cold working.

In many applications it may be desirable to have several IR sources mounted closely together, either in a row or in a two-dimensional matrix, as illustrated in FIG. 3. Electrically these may then be coupled so as to make two or more source elements be simultaneously excited, e.g., to assemble a particularly-large and powerful IR source. Alternatively, the source elements may also be coupled in such a way that one or more elements are excited independently of other elements, for instance, in time multiplexing of different spectral IR pulses, or in order to simulate a thermally variable scene or picture.

Different materials may be used for making the IR source. The foil-shaped material can be selected as at least one of the group consisting of metals, metallic alloys, ceramic materials, semiconducting materials and carbon-based materials, where the metallic alloys comprise iron, nickel, chromium, molybdenum, aluminum, cobalt, titanium and/or metallic glasses, and where the carbon-based materials include fullerenes and materials consisting of at least one diamond-like network. The surface of the foil-shaped material can be selected as one of the group consisting of porous materials and materials having a textured, microscopic depth structure. Certain metals, alloys and metallic glasses exist industrially as rolled foils in micron thicknesses. For example, several nickel-chromium-iron based alloys are made to be used in extreme thermal environments, and often have high emissivities in their natural state. As with metallic glasses, many ceramic materials, too, may be made with predetermined electrical conductivities. Ceramics may be deposited from liquid phase into preferred shapes and thicknesses, which may be exploited to make IR sources. In addition, IR sources made from semiconductor materials may be an obvious choice, particularly silicon but others, too, which let themselves to doping and treatments with etching and other techniques into preferred shapes etc. Moreover, carbon based chemistry is rapidly developing, with new kinds of materials comprising fullerenes as well as carbon-based, diamond-type networks and other formats that may be used for making IR sources. Porous materials represent a special alternative, because low density (i.e., small $\rho$) and large mechanical strength per square weight may allow shorter IR pulses to be obtained than can be had with homogeneous materials, for similar temperature amplitudes and physical thicknesses. Altogether the disclosed materials constitute a broad selection, each of which materials may offer different advantages for the manufacture of IR sources according to the invention.

Several of the disclosed materials, however, may have low emissivities in their natural state.

High emissivity is important to obtain fast and powerful radiative cooling and strong IR signals. Thus, the emissivity $\epsilon$ enters into the characterizing relation (3). By applying a microscopic depth structure—a "texture"—to the surface of the source material, the emissivity may be improved to reach nearly its theoretically maximum value.

To this end a multitude of established industrial methods exist, such as, for example, chemical etching and ion/plasma treatment in vacuo, which may to some extent also be arranged to impart a systematic shape to the texture to obtain special effects.

With regard to the stability and reproducibility of the IR source over time, it may be advantageous to keep the source in an hermetically sealed encapsulation, which has been either evacuated or else by other means made devoid of reactive gases. Efficient radiative cooling requires that the source be able to dispose of its heat, by radiating as freely as possible to both sides. Often one may also wish to employ signals from the front as well as the rear side of the source. FIG. 4 shows an example of an IR source 40 mounted in an encapsulation 41 with two windows 42 and 43, and with electrical feed-throughs 44 and 45 for the supply of electrical current to the source. This solution comprises an encapsulation with IR transparent windows adapted to at least one of opposite faces of the source. Another solution is one in which the encapsulation has a bulb- or cylinder-like shape made from IR transmitting glass or other IR transparent material, with remaining remedies. Variants of different solutions may also be practicable.

The IR pulses in question consist of three distinct phases: A heating phase, an emission phase and a cooling phase. In order to achieve well-defined IR pulses, it is preferable to make the source heat rapidly to its operating temperature for each pulse. This may be obtained by the use of current pulses with a first part that carries a high current, and whose energy contents at least matches $E_s$ of equation (2) above; indeed, if the heating and cooling phases are approximately of equal duration, this initial part of the current pulse actually must contain an amount of energy quite close to $2 E_s$. The first part of the current pulse is adjusted to bring the source to its operating temperature $T_m$. Thereafter, the current is reduced to a constant, lower level which serves to maintain the operating temperature. FIG. 5 shows an example of such a preferred current pulse 53, and the resulting temperature history 54 of the source. The duration 55 of the constant level of the current pulse is adapted to the desired length $\theta$ of the IR pulse. Since the source does not become further heated during the emission phase, essentially all electrical energy that is supplied to the source in this phase becomes radiated off as thermal energy. This secures a high energy efficiency.

When the current pulse is switched off, the thermal energy that was stored in the source during the heating phase, becomes quickly removed by continued radiation, which produces a short cooling phase with strong initial cooling that weakens as the temperature keeps falling.

The invention provides a method for pulse-wise identification, measurement and/or warning of gas by means of one or more IR sources. The method is distinct from similar methods that are applied in prior-art IR sensors, in that the measurements are made in a pulse-wise manner using a pulsed IR source which has been produced in accordance with the present invention. This imposes certain limitations on the pulse lengths that may be used in the method. FIG. 6 shows how the method is in principle carried out, by means of an IR source 61 that is excited by an electrical drive circuit 62, and where the IR radiation is guided via an optical element 63 through an open or enclosed volume of gas 64 and a spectrally selective element 65 onto an IR detector 66, followed by electronic equipment 67 for the amplification, treatment and/or presentation of the resulting signals. The order of the individual components in FIG. 6 is insignificant and may be changed as desired.

When practicing the method, one may then have at one's disposal, among others, an IR source that has been manufactured according to the invention from a material with given values of $C$, $\rho$ and $\epsilon$, and which is characterized by an actual and concrete thickness $d_0$ as one of its crucial specifications.

In the first place, the method will be characterized by deciding on a temperature $T_m$ and a temperature amplitude $\Delta T_1$ at which the source is to be operated. For good single-pulse measurements to obtain, $\Delta T_1$ should preferentially be chosen to be larger than 100 K.

Secondly, and inherent to the method, it must be decided which pulse lengths $\theta_1$ may be used for those measurements that the method is to perform. By means of relation (3), one finds that the relevant pulse lengths have to satisfy the relation $$\theta_1 > (C\rho d_0 / 2\epsilon\sigma T_m^4)\Delta T_1. \quad (5)$$

Consequently, and according to the invention, the method is characterized by being practiced with those pulse lengths $\theta_1$ which, for the actual, existing IR source at hand and in accordance with relation (5), may at all be allowed for radiation-cooled IR sources that are manufactured according to the invention and with the chosen values for the temperature $T_m$ and the temperature amplitude $\Delta T_1$ of the IR source. However, if the pulse lengths $\theta_1$ that result from this are initially too long, compared to the time resolution that has been set for the measurements, an optimization has to be made by choosing other values for $T_m$ and/or $\Delta T_1$, to the extent that such is compatible with the technical parameters and specifications for the actual materials and measurements. This may be achieved through an iterative process, until a new value for the pulse length $\theta_1$ has been established, that is sufficiently short and which still satisfies relation (5), however, with adjusted values for $T_m$ and/or $\Delta T_1$ as compared to the starting point. As explained above, the price to be paid for such an optimization in the direction of shorter $\theta_1$ and where $\Delta T_1$ remains constant or has to be reduced, is that the electronic noise in the measurements is due to increase.

With reference to FIG. 5, the method according to the invention may be further specified to employ a summation of the electrical signals from the IR detector, inside an interval of time 51 called $\Gamma_1$ when the source radiates from the lower temperature level $T_0$, and inside a similar time interval 52 called $\Gamma_2$ and which is less than or equal to the pulse length $\theta_1$, when the IR source radiates from the higher temperature level $T_m$. In the technical literature, such a measurement technique that operates inside given time intervals is termed "box-car integration". The method is complementary to that which is used in existing IR sensors, where signals are summed along a frequency axis and inside a given frequency interval at a certain modulation or chop frequency, whereas in the method according to the invention signals can be summed inside a given time interval along a time axis. The difference in summed signals between the two time intervals is used as a measure of the amount of pulse-wise IR radiation which illuminates the actual IR detector, in analogy with what is otherwise common technology. In order to reduce the noise it may be an advantage to make $\Gamma_1$ as large as possible, within the limits that are set by the temporal development between two consecutive pulses.

With reference to FIG. 6, a sensor for use in the method according to the invention may comprise those same components that are cited in the method discussed above. Thus, the sensor comprises an IR source that has been manufactured as described earlier herein, and which is, among other factors, characterized by an actual and concrete thickness do as one of its crucial specifications. In a manner corresponding to the method which the sensor is to embody, the sensor is characterized in that the IR source is operated with a definite temperature amplitude $\Delta T_1$ at a higher temperature level $T_m$ and with pulse lengths $\theta_1$ that satisfy relation (5), however, in which $\Delta T_1$ as well as $T_m$ and $\theta_1$ may have been subject to the eventual optimization according to the invention as a part of adapting the method to the actual measurement task. The method according to the invention thus serves to define the operational parameters for that particular IR source which is included in the sensor according to the invention, and thereby to define the necessary conditions that enable the sensor to perform those measurement tasks that are to be solved.

An embodiment of a sensor according to the invention is adapted to comprise equipment for "box-car" integration of signals inside the said time intervals $\Gamma_1$ and $\Gamma_2$, and to register or calculate the difference between those integrated signals as a measure of the amount of IR radiation that illuminates each single detector through the said volume of gas. A unique, exponential relation exists, between the relative amounts of radiation that reach a detector and the amounts of gas present in the volume, from which the gas density can be derived with known methods.

As spectrally selective elements, one or more infrared narrow-band filters may be used, adapted to the gases in question. These are standard industrial components that are easily available, and which are applied as a matter of routine and in large numbers for similar purposes within the prior art. The filters may in principle be situated anywhere between the source and the detector. At least one filter is required for each gas to be measured; in addition, it is advantageous to employ at least one extra filter that does not coincide with the spectra of any of the gases that may be present. Said extra filters are used to establish a zero reference for the measurements, in regard to external factors other than gas and which may be assumed to influence all spectral measurements to the same extent, as for example dust accumulation on lenses and windows.

Another way to establish spectral selection is by means of a dispersive element, as for instance a prism or an optical grating. These, too, are standard components within IR technology. One or more such dispersive elements may include a spherical infrared-optical grating. The latter alternative is illustrated in FIG. 7, where one or more IR sources 71 illuminate a detector 72 through a narrow slit or aperture 73 via a spherical grating 74. The advantage gained by this is that the spherical grating also serves in a manner resemblant of a lens, to focus the radiation from the IR sources onto the detector. The physical width of the aperture may then be adapted to the spectral width of the gas spectra with high accuracy, and often far better than with narrow-band filters. Moreover, different spectral components shall pass through the aperture, depending on the position of each IR source relative to the grating. However, dispersive elements tend to be considerably more expensive than spectral filters, and so may be mostly relevant for more costly multigas sensors.

A sensor according to the invention may include one or more IR sources that illuminate two or more IR detectors. For example, one IR source may illuminate two detectors simultaneously, each of the detectors being equipped with its own IR filter for gas measurement and reference purposes, respectively. This may be a relevant solution for a simple and inexpensive single-gas sensor with reference measurement. Other combinations comprising several sources and/or detectors may be of interest, too, for special purposes.

The sensor may be one in which a single detector is illuminated by several IR sources, which are pulsed at different times. One then has the opportunity of time multiplexing the spectral signals, in such a way that the position in time for each pulse uniquely defines its spectral contents. This may happen, for instance, by placing the IR filters close to the IR sources. Most elegantly, however, time multiplexing may be executed by means of a spherical grating as illustrated in FIG. 7, in which the slit 73 has been placed in one focal point of the grating and the IR sources 71 are situated along a focal line on the other side of the grating. Each IR source then illuminates the detector with its own distinct spectral IR pulse at distinct times. With a common reference detector on the rear side of the IR sources, one may then also be able continuously to correct for any variations in radiation from one or more sources.

IR detectors normally are quite small, of the order of $mm^2$, so that most often optics will be required to collect a sufficient amount of radiation from the IR source. As has already been mentioned above, with the present invention it will be possible to make large IR sources, that may be pulsed as quickly and as often as small sources. With only a short distance to the IR source, the detector thus shall see the source at a relatively large solid angle. Even without optics, the detector may then intercept enough radiation for the measurements to be made. The optical arrangements then may simply consist of free and unobstructed propagation through the gas volume. A sensor that is made in this way may very easily be adapted to employ several detectors for one and the same source. When it comes to measurements of larger gas densities, which require short paths through the gas volume, specific designs according to the invention may come to be preferred; this will make the sensor particularly robust against mechanical faults and misalignments in the mounting of components during production.

The best IR detectors are made from semiconductor materials, and often need cooling to reach low noise conditions. Therefore they become as a rule also rather expensive; indeed, the IR detector is quite often the most costly single component in an IR sensor. In particular when using modulated IR sources, it has been necessary to employ such good detectors due to the minute IR signals. The large signals that are obtained with the present invention, however, enable the use of far simpler and inexpensive detectors. Among these, thermopile detectors—essentially a row of thermocouples connected in series—are particularly interesting. They are cheap and simple, but have low sensitivities and higher noise levels compared with the semiconductor detectors. On the other hand, they have no 1/f noise, because they are pure voltage generators. This enables them to be used at low frequencies without thereby increasing the noise. Therefore, thermopile detectors are ideally suited in sensors that apply the present IR sources, which according to the analysis presented above may appropriately be pulsed with relatively long pulses at correspondingly low frequencies. Thermopile detectors thus may be used in sensors according to the invention. For simple, single gas sensors in particular, the use of such detectors may make the sensors sufficiently inexpensive to open up new and large markets for IR measurement and warning of gas.

From the outset, the sensors are arranged to execute the measurements in a single IR pulse, which has been adapted to the technical demands of the task in accordance with the invention. In several contexts, particularly when there are no high demands on time resolution but when the accuracy and sensitivity of measurements become important, it may be an additional advantage to sum the signals over several pulses from one and the same detector. This improves the S/N ratio, and may, e.g., be relevant in measurements of many pollutant gases in ambient air indoors and outdoors, whose relative abundances are a question of millionths (ppm) or less.

Carbon monoxide is a colorless and odorless gas, which accompanies incomplete combustion in gas ovens as well as in fires. For instance, fire casualties normally die from carbon monoxide poisoning long before the fire is fully developed. Measurement of carbon monoxide thus may lead to improved warnings of fires as well as poisonous gas, and it is recognized in those trades that such needs do exist. Because of their complexity and price, however, IR sensors have not so far been applied to said purposes in any large scale, while other kinds of gas sensors have not been regarded as sufficiently reliable. The actual gas densities that must be measured and warned of, are, in both cases, a matter of the order of 100 ppm. This is within reach of the present sensors. The present invention can be employed for the detection and warning of carbon monoxide for the said purposes as a relevant and timely application. The challenge shall be to make the sensors sufficiently inexpensive, so as to compete with existing technology based on quite different technical principles of measurement.

Medicine and physiology constitute a large and important application area for gas measurements. Traditionally this concerns in particular the measurement of carbon dioxide in exhalation, which provides information about energy consumption in the body. This is of interest for patients and athletes, and for large fractions of the population in general.

Measurement of gas in exhalation, however, may also be used in diagnosis, in that special gases may be produced in the body in connection with certain diseases; for instance, acetone is released in diabetes. Existing equipment is complex and expensive, and often requires long times for each measurement because exhaled gas is collected in large bags for subsequent analysis. Sensors according to the present invention make it feasible to develop more economic and simpler equipment, to be used both on people and animals. According to the invention, a sensor may be mounted in front of the mouth orifice, ideally as a stand-alone unit but alternatively also as a component in some larger instrumentation comprising hoses and other devices. In addition to establish spectral reference readings as might be required, measurements on the inspiration air also provides a zero level reference once per respiration cycle in relation to gas exhaled from the lungs. Moreover, the time between two consecutive inspirations or exhalations may provide a simple measure for the respiration frequency, which may in many circumstances be useful to assist in calculating the exhaled volume of gas, since the IR measurement itself measures only the gas density. An interesting variant of the said application thus would be a sensor to be used for athletes (and animals!) to monitor the carbon dioxide exhaled during exercise, with the option of optimizing and improving the efficiency of techniques and energy expenditure.

What is claimed is:

1. A method for pulse-wise identification, measurement and/or warning of one or more specific gases by means of a sensor composed of: at least one pulsed, radiation-cooled infrared radiation source, electrical means for pulse-wise heating of the at least one infrared radiation source with single pulses of electric current and in any preferred sequence of time, at least one infrared detector which is adapted to the detection of pulsed infrared radiation from the at least one infrared radiation source, at least one infrared spectrally selective element that is arranged between the at least one infrared radiation source and the at least one infrared detector and is adapted to spectral selection of the infrared radiation corresponding to specific spectral characteristics of the one or more specific gases, an open or closed volume of gas that is arranged between the at least one infrared radiation source and the at least one infrared detector, optical means which are arranged to guide infrared radiation from the at least one infrared radiation source via the at least one spectrally selective element onto the at least one infrared detector through the open or closed volume of gas, and electronic means adapted to the registration, amplification, treatment and/or presentation of such electrical signals as result when the infrared radiation is brought to illuminate the at least one infrared detector through the volume of gas via the at least one spectrally selective element, said method comprising the steps of:

operating the at least one infrared radiation source at a large temperature difference $\Delta T_1$ between a lower temperature level $T_o$ and a certain higher temperature level $T_m$, maintaining said higher temperature level $T_m$ for a certain period of time $\theta_1$ for each of said at least one infrared radiation source and within each of said single pulses of electric current, causing the duration of each resulting pulse of infrared radiation expressed as the temporal extension of said period of time $\theta_1$ to comply with the relation $$\theta_1 > (C\rho d_0/2\epsilon\sigma T_m^4)\Delta T_1$$

in which $d_o$ is the actual physical thickness of those parts of the at least one infrared radiation source that are adapted to be heated to the higher temperature level $T_m$, $\sigma = 5.67 \cdot 10^{-12}$ Wcm$^{-2}$K$^{-4}$ is the Stefan-Boltzmann constant, $\epsilon < 1$ is the emissivity, $\rho$ is the density and C is the specific thermal capacity of the at least one infrared radiation source, and adjusting the values of $T_m$ and $\Delta T_1$ as required by means of an iterative process until $\theta_1$ satisfies certain requirements of temporal resolution for said identification, measurement and/or warning.

2. The method according to claim 1, wherein temperature difference $\Delta T_1$ is greater than 100° K.

3. A sensor for carrying out the method according to claim 1 for pulse-wise identification, measurement and/or warning of one or more specific gases by means of at least one pulsed, radiation-cooled infrared radiation source, comprising electrical means which are adapted to pulse-wise heating of said at least one infrared radiation source with single pulses of electric current and in any preferred sequence of time, at least one infrared detector which is adapted to the detection of pulsed infrared radiation from said at least one infrared radiation source, at least one infrared spectrally selective element that is arranged between said infrared radiation source(s) and said infrared detector(s) and is adapted to spectral selection of said infrared radiation corresponding to specific spectral characteristics of said one or more specific gases, an open or closed volume of gas that is arranged between said infrared radiation source(s) and said infrared detector(s), optical means which are arranged to guide spectrally selected infrared radiation from said infrared radiation source(s) via said at least one spectrally selective element onto said infrared detector(s) through said open or closed volume of gas, and electronic means adapted to the registration, amplification, treatment and/or presentation of such electrical signals as result when said infrared radiation is brought to illuminate said infrared detector(s) through said volume of gas via said spectrally selective element(s), wherein said at least one infrared radiation source is adapted to be operated at a certain, large and preferentially larger than 100 K temperature difference $\Delta T_1$ between a lower temperature level $T_0$ and a certain higher temperature level $T_m$, in that the said higher temperature level $T_m$ is maintained for a period of time $\theta_1$ for each of said at least one infrared radiation source and within each of said single pulse of electric current, and in that the duration of the resulting said pulse(s) of infrared radiation expressed as said period of time $\theta_1$ has been chosen in accordance with the relation $$\theta_1 > (C\rho d_0/2\epsilon\sigma T_m^4)\Delta T_1$$

in which $d_0$ is the actual physical thickness of those parts of said at least one infrared radiation source that are adapted to be heated to said higher temperature level $T_m$.

4. A sensor according to claim 3, wherein said electronic means which are adapted to the registration, amplification, treatment and/or presentation of said electrical signals comprise equipment that has been arranged to integrate over time such electrical signals as result from each of said at least one infrared detector inside a time interval $\Gamma_1$ when said at least one detector is illuminated by one or more of said at least one infrared radiation source radiating from said lower temperature level $T_0$ and to register the corresponding integrated electrical signals from said at least one detector inside a time interval $\Gamma_2 < \theta_1$ when said at least one radiation source radiates from said certain higher temperature level $T_m$, and that has been adapted to register and/or to calculate the difference between said integrated electrical signals from said two time intervals $\Gamma_1$ and $\Gamma_2$, respectively, as a measure of the pulse-wise amount of infrared radiation that reaches said at least one detector from said at least one infrared radiation source through said volume of gas via said at least one infrared spectrally selective element and inside a spectral band that is characteristic of at least one of said specific gases.

5. A sensor according to claim 3, wherein said at least one spectrally selective element comprises one or more infrared spectral filters.

6. A sensor according to claim 3, wherein said at least one spectrally selective element comprises one or more spectrally dispersive elements, including a spherical infrared-optical grating.

7. A sensor according to claim 3, wherein two or more of said at least one infrared radiation source are pulsed at unequal times and in that infrared radiation from at least two of said two or more radiation sources illuminates one and the same infrared detector.

8. A sensor according to claim 3, wherein it is adapted to detect carbon monoxide in densities of the order of 100 ppm or less and to provide a warning of gas or fire hazard when said gas density is exceeded.

9. A sensor according to claim 3, wherein it is adapted to continuously register the amount of a gas, e.g. carbon dioxide in inspiration and exhalation during each single respiration cycle of humans or animals, in that the sensor furthermore is mounted in front of the mouth orifice and is adapted to use for each cycle the contents of each single gas in the inspiration air as a zero level reference relative to the amount of said single gas in the exhalation air, and in that it is adapted to register the time between two consecutive inspirations and/or exhalations and to use the inverse of that time as a measure of the respiration frequency.

10. A sensor according to claim 3, wherein in said radiation source said electrically conductive element is mounted as a curve-shaped bridge between two fastening arrangements which may also serve as electrical contacts.

11. A sensor according to claim 3, wherein in said radiation source said electrically conductive element has a width which is larger near the ends of the filament and which has a tapering shape towards the middle of those parts of the element that are adapted to be heated to said higher temperature level.

12. A sensor according to claim 3, wherein in said radiation source said foil-shaped material is selected as at least one of the group consisting of metals, metallic alloys, ceramic materials, semiconducting materials and carbon-based materials, where the metallic alloys comprise iron, nickel, chromium, molybdenum, aluminum, cobalt, titanium and/or metallic glasses, and where the carbon-based materials include fullerenes and materials consisting of at least one diamond-like network.

* * * * *